(12) United States Patent
Khovaylo

(10) Patent No.: US 7,423,786 B2
(45) Date of Patent: *Sep. 9, 2008

(54) OPTICAL SCANNER WITH INCLINED PLATEN

(75) Inventor: Modest Khovaylo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 11/115,011

(22) Filed: Apr. 26, 2005

(65) Prior Publication Data

US 2005/0190413 A1 Sep. 1, 2005

Related U.S. Application Data

(63) Continuation of application No. 10/630,545, filed on Jul. 29, 2003, now Pat. No. 6,909,527, which is a continuation of application No. 09/154,001, filed on Sep. 16, 1998, now Pat. No. 6,661,537.

(51) Int. Cl.
*H04N 1/04* (2006.01)

(52) U.S. Cl. ............... 358/474; 358/496; 358/497; 358/494; 382/312; 382/317

(58) Field of Classification Search ............... 358/474, 358/505, 487, 497, 486, 494, 496; 382/312, 382/317, 313

See application file for complete search history.

(56) References Cited

U.S. PATENT DOCUMENTS

| | | | | |
|---|---|---|---|---|
| 3,800,439 A | * | 4/1974 | Sokolski et al. | 434/355 |
| 4,933,753 A | * | 6/1990 | Watanabe | 358/503 |
| 5,072,252 A | * | 12/1991 | Howseman, Jr. | 355/1 |
| 5,285,237 A | * | 2/1994 | Parulski et al. | 355/75 |
| 5,410,347 A | * | 4/1995 | Steinle et al. | 348/270 |
| 5,475,505 A | * | 12/1995 | Minasian et al. | 358/474 |
| 5,814,809 A | * | 9/1998 | Han | 250/208.1 |
| 5,847,846 A | * | 12/1998 | Wu et al. | 358/475 |
| 5,912,747 A | * | 6/1999 | Murakami | 358/497 |
| 6,091,516 A | * | 7/2000 | Chang et al. | 358/474 |
| 6,233,064 B1 | * | 5/2001 | Griffin | 358/474 |
| 6,661,537 B1 | * | 12/2003 | Khovaylo | 358/474 |
| 6,909,527 B2 | * | 6/2005 | Khovaylo | 358/474 |
| 2007/0223060 A1 | * | 9/2007 | Ikeno et al. | 358/497 |

* cited by examiner

*Primary Examiner*—Edward L. Coles
*Assistant Examiner*—Negussie Worku

(57) ABSTRACT

An optical scanner including a housing having a top portion, a bottom portion, a front portion and a rear portion; a platen member forming a portion of the housing top portion, the platen member having a flat upper surface defining a platen plane; a scanner base provided on the housing bottom portion and defining a base plane; the platen plane being inclined relative to the base plane.

12 Claims, 6 Drawing Sheets

OPTICAL SCANNER WITH INCLINED PLATEN

This is a continuation of U.S. patent application Ser. No. 10/630,545 filed Jul. 29, 2003 now U.S. Pat. No. 6,909,527, for OPTICAL SCANNER WITH INCLINED PLATEN, which is a continuation of U.S. patent application Ser. No. 09/154,001 filed Sep. 16, 1998, for OPTICAL SCANNER WITH INCLINED PLATEN now U.S. Pat. No. 6,661,537 issued Dec. 9, 2003, both of which are hereby incorporated by reference.

BACKGROUND OF THE INVENTION

The present invention relates generally to optical scanners and, more particularly, to a flatbed optical scanner having an inclined platen.

Optical scanners create electronic data representative of a scanned object. Flatbed optical scanners are stationary devices which have a transparent, horizontally disposed, flat plate or platen upon which an object to be scanned, such as a paper document, is placed. The document is scanned by sequentially imaging narrow strip or scan line portions of the document on a linear optical sensor array such as a charge coupled device (CCD). The optical sensor array produces electronic data which is representative of each scan line portion of the document which is imaged thereon. In one type of flat bed scanner the current scan line portion of the document which is imaged on the sensor array is changed or "swept" by moving the platen supporting the document relative to the scanner imaging assembly.

In another, more popular, type of flat bed scanner the platen and document remain stationary and at least a portion of an imaging assembly is moved to change the scan line portion which is currently imaged. A flatbed optical scanner of the fixed platen type has a housing enclosing and shielding various optical and mechanical assemblies of the scanner. The scanner platen forms part of the top portion of the housing. A carriage assembly, typically mounted on horizontal rails, is displaced below and parallel to the scanner. Fixed platen flatbed scanners are disclosed in the following patents, each of which is hereby incorporated by reference for all that is disclosed therein: Boyd et al., U.S. Pat. No. 4,926,041; Boyd et al., U.S. Pat. No. 5,336,878; Henry et al., U.S. Pat. No. 5,339,107; Steinle et al., U.S. Pat. No. 5,410,347; and Steinle et al., U.S. Pat. No. 5,646,394.

As the number of peripheral devices which may be connected to personal computers has increased in recent years, the need to reduce the desk space occupied by such peripheral devices has also increased. Reducing the desk space or "footprint" occupied by a flatbed optical scanners has been difficult. Certain size reductions have been achieved by reducing the size of scanner mechanical/optical assemblies. However the need for a scanner platen as large as the document which is to be scanned has heretofore limited designers ability to shrink flatbed scanner footprints. A similar design concern is scanner height. A person seated at a desk may use a scanner more easily if he/she can view the scanner platen from a position a foot or more above it. An elevated viewing position allows the user to more easily see and change the relative position of the document on the platen to align it with registration marks, etc. Thus, it is generally desirable to reduce scanner height. Design constraints which limit scanner height reduction include the need for a mechanical carriage assembly positioned below the scanner platen and the requirement for drive motors, etc. positioned within the scanner housing.

SUMMARY OF THE INVENTION

One embodiment of the invention comprises a flatbed optical scanner comprising: an inclined platen having higher end portion and a lower end portion; and a scanner carriage displaceable between said higher end portion and said lower end portion of said inclined platen.

Another embodiment of the invention comprises a flatbed optical scanner comprising: means for supporting a document in an inclined relationship with a horizontal plane and in a transparent relationship with an imaging light source positioned below the document; means for displacing said imaging light source between a relatively lower positions and a relatively higher position along an inclined displacement path.

Another embodiment of the invention comprises a method of scanning a document comprising: placing the document on a platen; displacing a scanner carriage along an inclined displacement path adjacent the platen between relatively higher and lower positions on said path.

Another embodiment of the invention comprises a method of scanning a document comprising: facing a front end portion of a flatbed scanner; rotating a scanner cover hinged at a rear end portion of the scanner; placing the document on an inclined platen having a lower end at the front end portion of the scanner; registering an edge portion of the document with a registration surface positioned proximate the lower end of the platen.

BRIEF DESCRIPTION OF THE DRAWING

An exemplary embodiment of the invention is shown in the accompanying drawing in which.

DETAILED DESCRIPTION OF THE INVENTION

Figure 1:
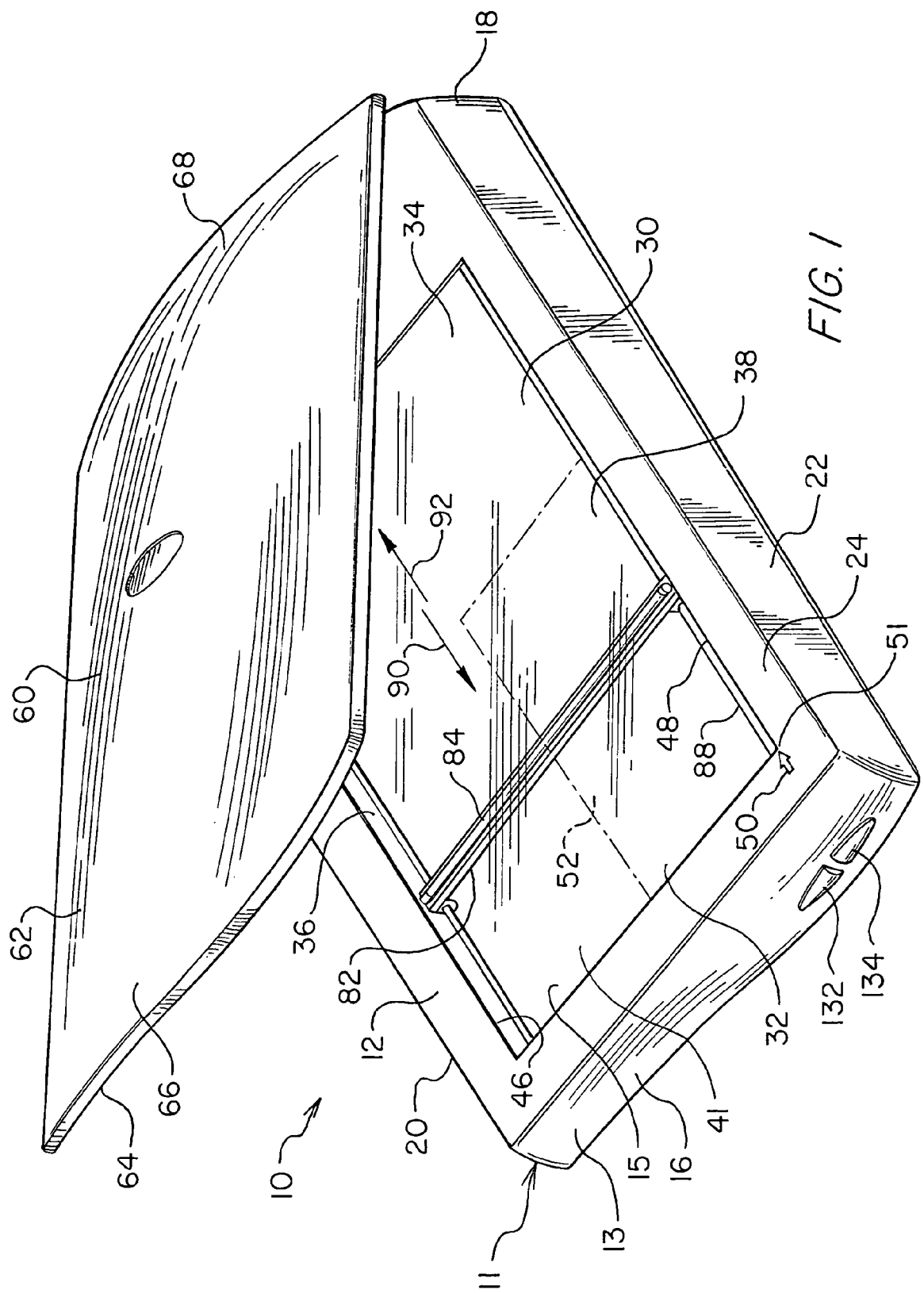
FIG. 1 is a perspective view of an optical scanner with a cover portion thereof partially raised.

Drawing FIG. 1-7, in general, illustrate an optical scanner 10 including a housing 11 having a top portion 12, a bottom portion 14, a front portion 16 and a rear portion 18. A platen member 30 forms a portion of the housing top portion 12. The platen member 30 has a flat upper surface 39 defining a platen plane PP. A scanner base 110 is provide on the housing bottom portion 14 and defines a base plane BB. The platen plane PP is inclined relative to the base plane BB.

Having thus described scanner 10 in general, a more detailed description will now be provided.

Figure 2:
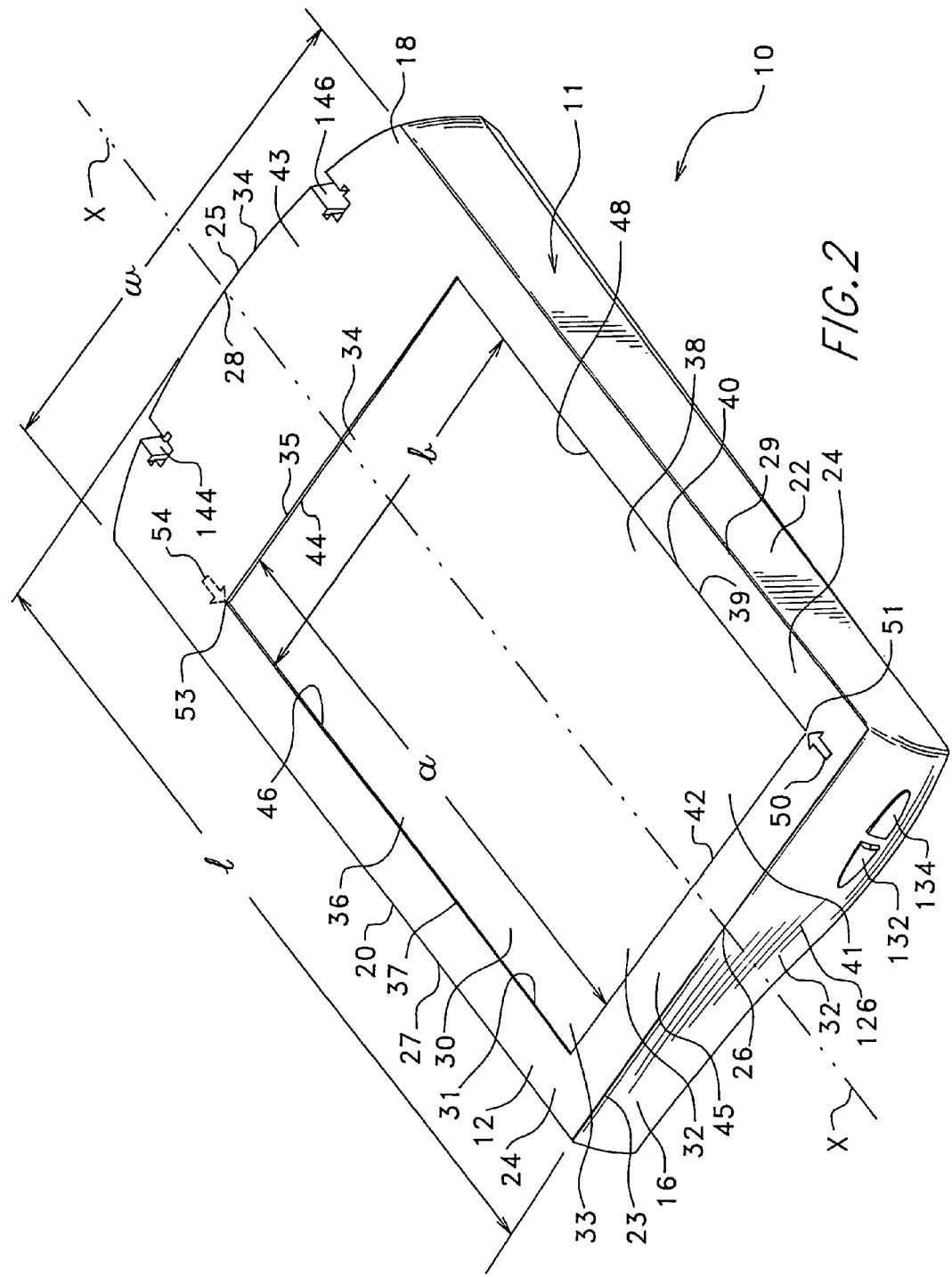
FIG. 2 is a perspective view of an optical scanner with a cover portion thereof removed.
Figure 3:
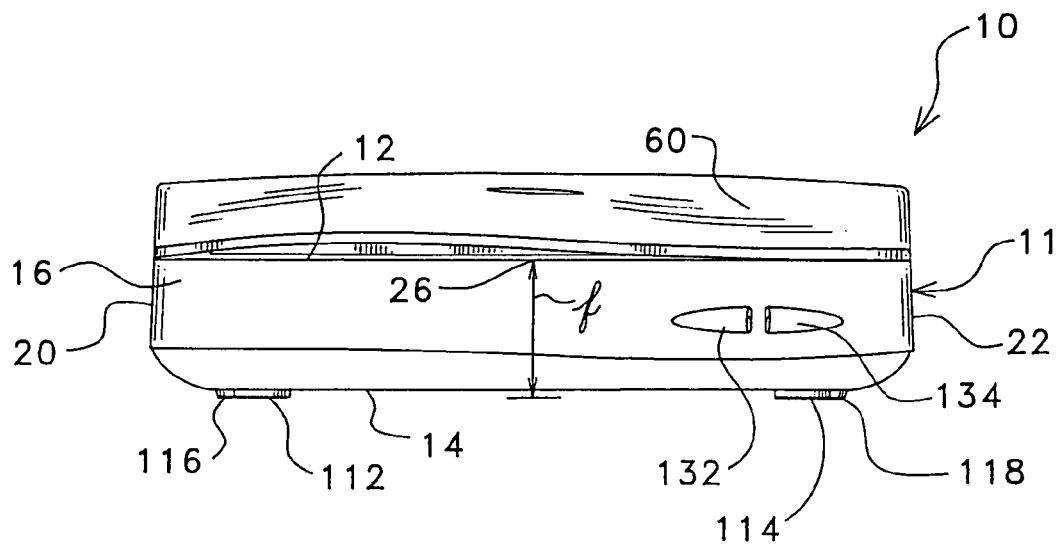
FIG. 3 is a front elevation view of an optical scanner.
Figure 4:
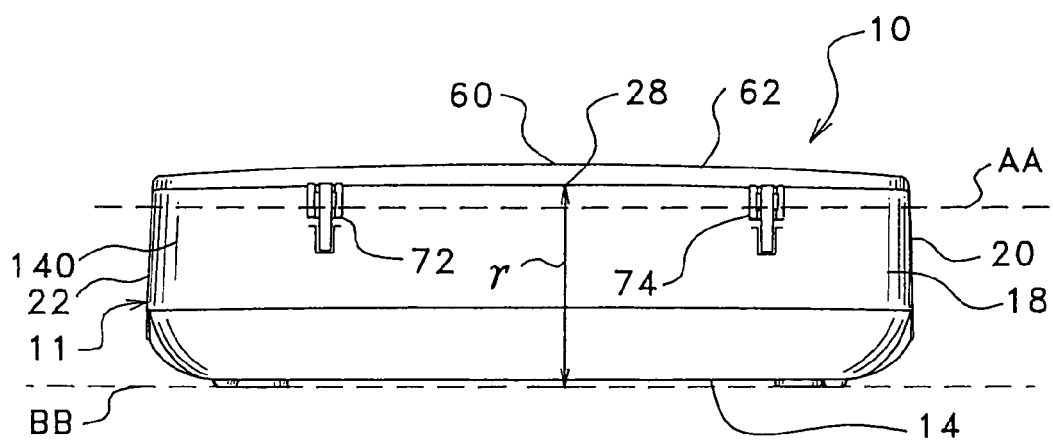
FIG. 4 is a back elevation view of an optical scanner.

As best shown in FIGS. 1 and 2, scanner 10 comprises a generally box shaped housing 11 which encloses various scanner mechanical and optical components. The housing has a thin, e.g. 3 mm, housing wall with an exterior surface 13 and an interior surface 15 (viewable through the platen in FIG. 1). The housing 11 has a top portion 12, a bottom portion 14, a front portion 16, a rear portion 18, a left portion 20, and a right portion 22. Top portion 12 includes a flat, opaque wall portion 24 having front, rear, left and right inner terminal edges 23, 25, 27, 29 and having front, rear, left and right inner terminal edges 33, 35, 37, 39. The inner terminal edges define a window opening 31. The top portion has a central longitudinal axis XX passing through central front point 26 on front edge 23 and central rear portion 28 on rear edge 25.

A flat platen member 30, which may be constructed from a glass plate or any other suitable transparent material, is mounted in covering relationship with window opening 31. Platen member 30 comprises front, rear, left, and right, portions 32, 34, 36, 38. Platen member 30 is preferably mounted in covering relationship with window opening 31 by holding an outer peripheral portion (not shown) of the top surface 41 of the platen in abutting or near abutting relationship with the interior (lower) surface 15 of opaque wall portion 24 using suitable mounting devices such as brackets (not shown). Top surface 41 defines a platen plane PP. The interior edge of wall portion 24 forms a peripheral abutment portion 40 including vertical front, rear, left, and right linear wall edge portions 42, 44, 46, 48 around window opening 31. The linear wall edge portions 42, 44, 46, 48 act as alignment guides for paper documents and the like which are placed on the scanner platen 30.

As best shown in FIG. 2, the length of the portion 43 of the flat opaque top portion 24 extending between outer and inner rear edges 25, 35 (which may be e.g. 100 mm) is much longer than the length of the portion 45 thereof extending between front outer and inner edges 23, 33 (which may be e.g. 34 mm). Most scanners have such a length differential between back and front portions 43, 45 of the opaque top wall 24. The reason for this, as in the case of the described embodiment, is that a scanner motor (not shown) and/or portion of the carriage drive assembly and/or other scanner components (now shown) much be positioned so as not to interfere with movement of the scanner carriage below the platen 30. These components may thus be housed below the rear expanse of the opaque wall portion 24 to avoid interfering with carriage movement.

Registration indicia, such as mark 50 portioned at the corner 51 formed by edges 37 and 39, may be provided on or adjacent to the platen 30 to inform a user where a corner portion of a document is to be positioned for proper registration with the scanner 1-0. An alternative position for a registration mark is shown at 54, FIG. 2, at the corner 53 formed by edges 35 and 37.

A scanner cover 60 having a top surface 62, a bottom surface 64, a front portion 66, and a rear portion 68 is pivotally mounted on housing 11 as by first and second hinge assemblies 72, 74. Each hinge assembly may have a first portion 76 connected to the cover, a second portion 78, connected to the housing, and a hinge pin 80 defining a hinge axis AA. The hinge axis AA is positioned at a rear portion of the scanner 10 at the end opposite from registration mark 50. The scanner cover may be of a conventional construction with a lower surface adapted to completely cover the scanner platen 30 to shield it and a document placed on it from outside light during scanning.

As shown in FIG. 1, a scanner carriage 82, which includes a scanner light sourced such as a fluorescent bulb 84, is positioned for reciprocal displacement below the scanner platen 30 in a plane of movement LL parallel to platen plane PP, FIG. 5. The carriage may be conventionally mounted for reciprocal displacement on guide rails 86, 88 and may be driven by a conventional scanner drive motor (not shown) in a first carriage direction 90 and a second carriage direction 92. Scanner displacement assemblies are of various types, some including illumination and all light path and sensor components within the moving scanner carriage, others, such as the well known "trombone" assembly having a moving light source and moving mirrors and a stationary sensor assembly. The present displacement assembly may be of any of the above described conventional types or other types.

Figure 5:
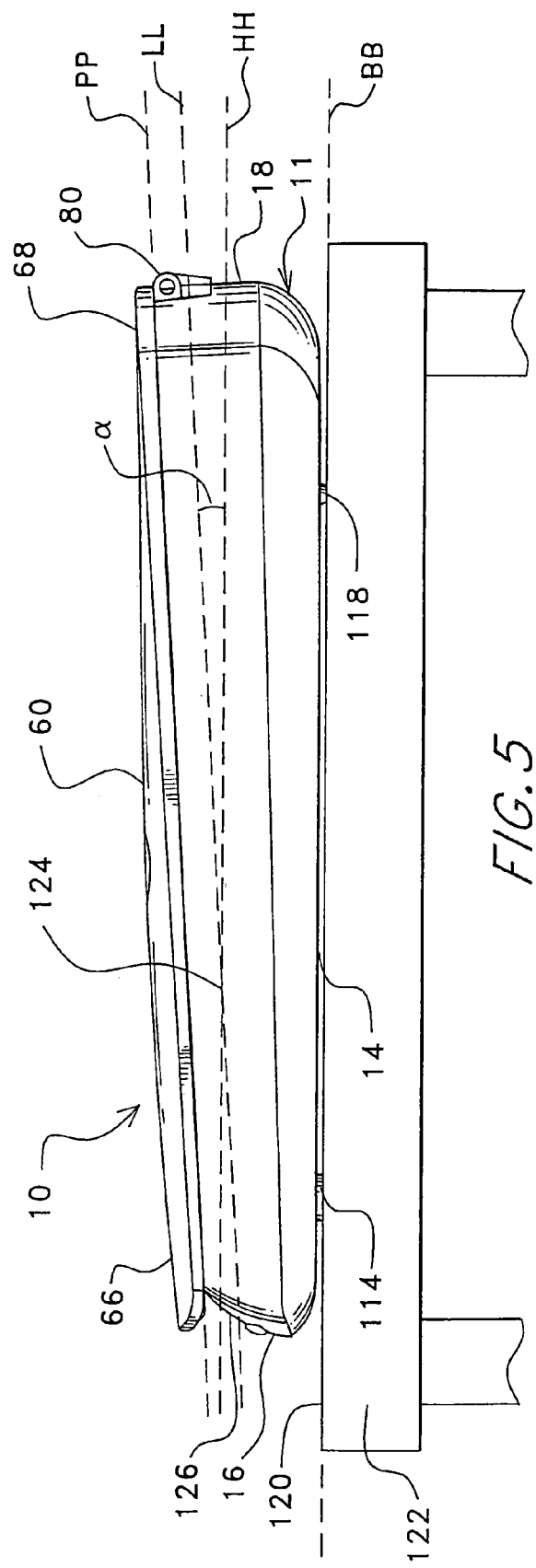
FIG. 5 is a right side elevation view of an optical scanner.

As best shown in FIGS. 3-6, a scanner based portion 110 is provided at the scanner bottom portion 14 and may comprise scanner feet 112, 114, 116, 118 or other structure which define a scanner base plane BB, FIG. 5. The plane BB defined by the scanner base portion will be coplanar with a flat top surface 120 of a structure such as a table or desk 122 on which the scanner base portion is supported. The desk top is generally a horizontal surface and thus all horizontal planes such as HH in FIG. 5 are parallel to the desk top and to base plane BB. The scanner platen plane PP is inclined downwardly and forwardly at an angle α with respect to scanner base plane BB, as shown in FIG. 5 by the intersection of plane PP with plane HH at 124 and as discussed in further detail below.

Scanner front portion 16 may comprise a generally rounded front face portion 126, as best shown in FIG. 5. Control buttons 124, 126 may be provided on the front fact portion to initiate predetermined scanner operations or operating modes, for example button 124 might be a printer mode actuation button causing scanner output to be sent directly to a printer (not shown) and button 126 might be a computer mode actuation button causing scanner output to be sent to an attached personal computer (not shown).

Figure 6:
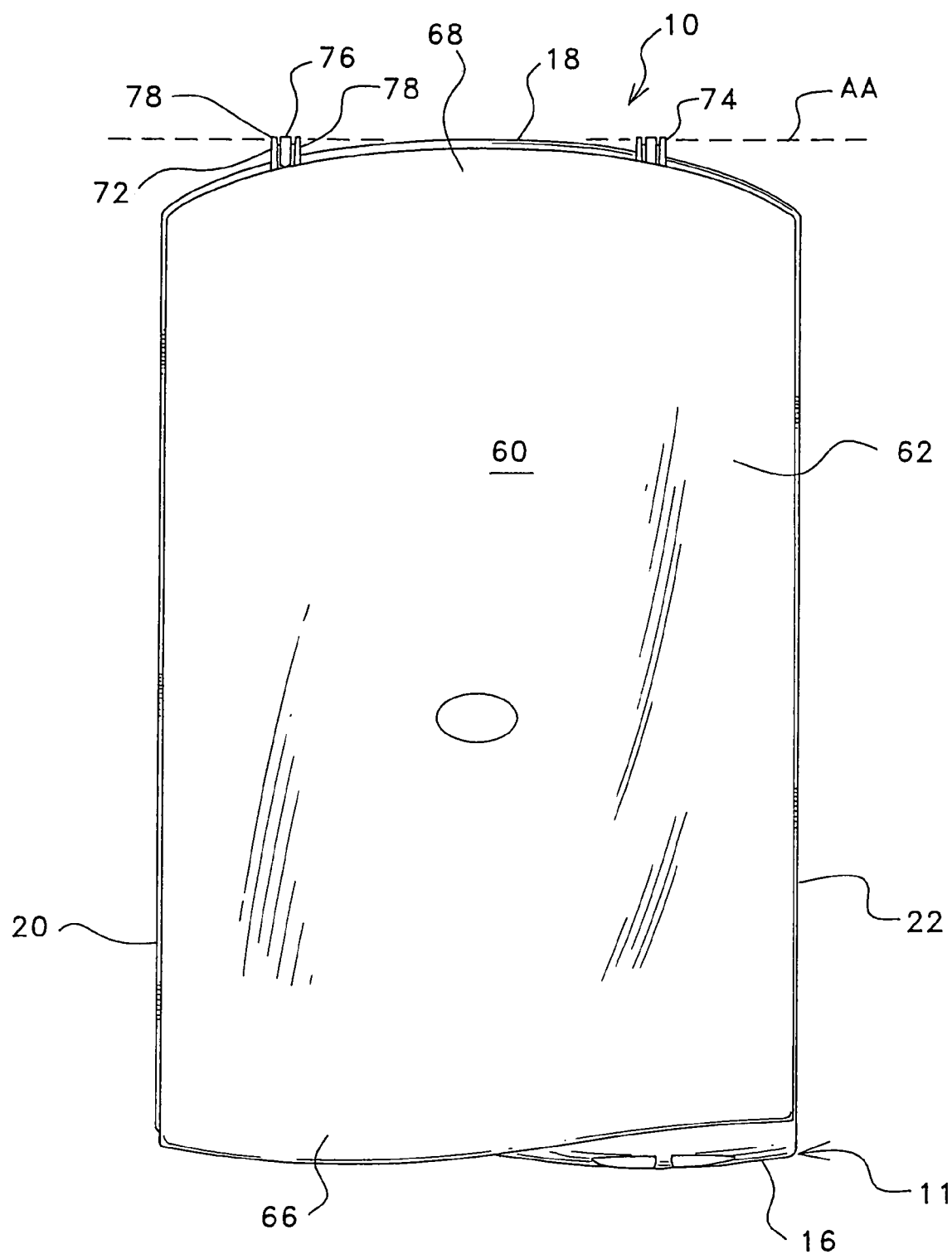
FIG. 6 is a top plan view of an optical scanner.
Figure 7:
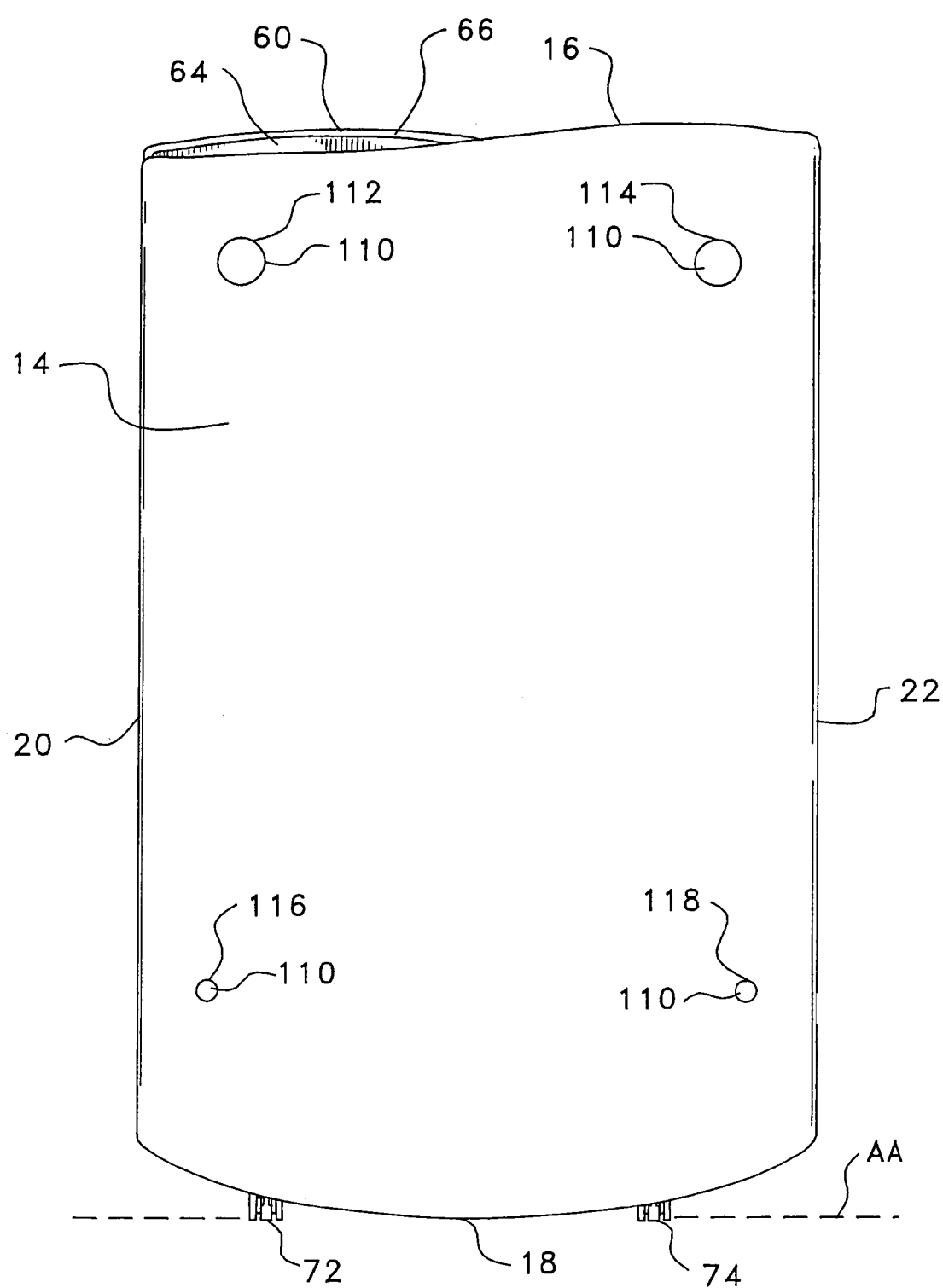
FIG. 7 is a bottom plan view of an optical scanner.

Scanner rear portion 18 may have a curved rear face 140 as viewed from above, as best shown in FIGS. 2, 6, and 7. Cutouts 144, 146, FIG. 2, in the rear portion may be used to mounted hinge assemblies, 72, 74, previously described.

In one embodiment, scanner housing 11 may have an overall length "I" of 440 mm; an overall width "w" of 281 mm; a front height "f" of 51 mm; and a rear height "r" of 76 mm. The lengthy "a" of window opening 31, may be 305 mm and the width "b" of window opening 31 may be 218 mm. The distance from edge 33 to edge 23 may be 34 mm and from edge 35 to edge 25 along axis XX may be 101 mm. The distanced from edge 27 to edge 37 may be 28 mm and the distance from edge 29 to edge 39 may be 35 mm. The housing, except for the platen portion thereof, may be constructed from metal or high strength plastic or other conventional housing material. Each of the above dimensions is merely exemplary and it is to be understood that the invention is not to be construed as being limited to a scanner having such dimensions.

It has been discovered by applicant that be including platen plane PP at an angle of between about 3° and about 10° that several advantageous results are obtained. One result is that the footprint of the scanner 10 is shortened with respect of the footprint of a scanner having the same length platen and the same general optical and mechanical assemblies. Another result is that the scanner platen 30 and associated registration indicia 50 or 54 are positioned at a better viewing angle for a user seated in front of the scanner 10. It is thus easier for a user to place a document 52 in alignment with registration indicia or a registration abutment surface such as 42, 44, 46, or 48. Registration indicia are typically positioned on a scanner near the rear portion 34 of the platen 30, such as shown at 54, so as to be at the end of the platen below which the carriage assembly is parked at the beginning and end of a scan. The scanner 10 in one preferred embodiment may have this conventional registration mark location. However in another preferred embodiment of the scanner 10 the registration indicia is located near the front portion 32 of the platen 30 as indicated at 50 to further increase the visibility of the registration mark and associated registration abutment surface 42, 48 for a person seated in front of the scanner 10. Another advantage of this configuration is that the rear portion 18 of the scanner is not significantly decreased in height and thus may conveniently house those mechanical and optical components beneath the rear expanse of top opaque portion 24 with little loss of space.

Although any angle of inclination could theoretically be used applicant has discovered certain practical limitation which makes an angle of a between about 3° and about 10° preferable. For angles greater than about 10° the inclination of the scanner carriage drive path causes problems with smooth carriage operation which in turn affects scanner performance. Another related problem is that more drive force is needed for upwardly inclined carriage movement than for horizontal displacement thus possibly necessitating larger drive motors for angles greater than about 10° . Another problem for angles more that about 10° is that is becomes difficult to accurately positional document 52 on the platen because it tends to slide out of place, particularly if the document is slightly curled. Another problem with move severe angles is that the height between the plate and the scanner bottom portion at the front of the scanner may become so small that the scanner carriage does not have proper operating clearance. Such a result would necessitate increasing the height of the scanner from front to back thus canceling out some of the other beneficial effects of the inclined platen design. Some similar disadvantages exist, but to a lesser degree, with inclination angles less than about 10°. Accordingly, in a one preferred embodiment of the scanner, angle α is between about 3° and about 7° and, in a most preferred embodiment of the scanner, angle α is between about 3° and about 5°. It has been found that an inclination of between about 3° and about 5° essentially eliminates all of the above described problems associated with large angles of inclination and yet provides significant increases in ease of use. It has also been discovered that even a small decrease in the height of the front face of a scanner creates a user perception of overall compactness much greater than the actual reduction in scanner volume. Thus, this design has a positive esthetic effect in addition to a functional ease of use effect. The curvature of the rear portion 18 of the scanner and the rounding of the front portion 16 of the scanner add to this impression of overall compactness.

While illustrative and presently preferred embodiments of the invention have been described in detail therein, it is to be understood that the inventive concepts may be otherwise variously embodied and employed and that the appended claims are intended to be construed to include such variations except insofar as limited by the prior art.

What is claimed is:

1. A flatbed optical scanner comprising:
    a scanner housing;
    an inclined platen having a higher end portion and a lower end portion mounted in said scanner housing; and
    a scanning head displaceable below said platen along an inclined displacement path; and
    wherein said scanner housing comprises a registration surface positioned proximate said lower end portion of said inclined platen and at least one registration indicia located on said housing adjacent said registration surface.

2. The scanner of claim 1, said at least one registration indicia comprising an arrow.

3. The scanner of claim 1, said scanner housing having a forward portion and a rear portion and further comprising scanner control surfaces mounted on said forward portion of said scanner housing.

4. The scanner of claim 3 wherein all scanner control surfaces are mounted on said forward portion of said scanner housing.

5. The scanner of claim 4 wherein all of said scanner control surfaces are mounted on the right side of a longitudinal center line of said scanner housing.

6. The scanner of claim 3 further comprising:
    a platen cover pivotally mounted on said scanner housing at a terminal edge of said rear portion of said housing, said platen cover having a pivot axis extending generally parallel to said registration surface.

7. The scanner of claim 1, said scanner housing having a forward portion and a rear portion and further comprising a platen cover pivotally mounted on said scanner housing at said rear portion thereof.

8. The scanner of claim 7, said platen cover being pivotally mounted at a terminal edge portion of said housing rear portion.

9. The scanner of claim 8, said platen cover having a pivot axis extending generally parallel to said registration surface.

10. A flatbed optical scanner comprising:
    a scanner housing having a forward portion and a rear portion;
    an inclined platen having a higher end portion and a lower end portion and being mounted in said scanner housing with said lower end portion of said platen positioned in said forward portion of said scanner housing;
    scanner control surfaces mounted on said forward portion of said scanner housing;
    a platen cover pivotally mounted on said scanner housing at a terminal rear edge of said rear portion of said housing; and
    a scanning head displaceable below said platen along an inclined displacement path.

11. The scanner of claim 10, said displacement path extending between said higher and lower end portions of said inclined platen.

12. The scanner of claim 10, said inclined platen being inclined at an angle between about 3 degrees and about 10 degrees with respect to a horizontal plane when said scanner is in a normal operating position.

* * * * *